United States Patent [19]
Dickie

[11] Patent Number: 6,016,152
[45] Date of Patent: Jan. 18, 2000

[54] APPARATUS AND METHOD FOR NON-UNIFORM IMAGE SCALING

[75] Inventor: Garth A. Dickie, Arlington, Mass.

[73] Assignee: Avid Technology, Inc., Tewksbury, Mass.

[21] Appl. No.: 08/904,470

[22] Filed: Aug. 1, 1997

[51] Int. Cl.⁷ .................................................. G06T 11/00
[52] U.S. Cl. .......................................................... 345/436
[58] Field of Search ..................................... 345/126, 425, 345/427, 430–431, 433, 436, 439; 358/183; 395/86, 127, 130

[56] References Cited

U.S. PATENT DOCUMENTS

| | | |
|---|---|---|
| 4,602,286 | 7/1986 | Kellar et al. . |
| 4,698,666 | 10/1987 | Lake, Jr. et al. . |
| 4,752,828 | 6/1988 | Chapuis et al. ............................ 358/183 |
| 5,153,937 | 10/1992 | Wobermin et al. . |
| 5,179,641 | 1/1993 | Comins et al. . |
| 5,204,944 | 4/1993 | Wolberg et al. ........................ 395/127 |
| 5,241,372 | 8/1993 | Ohba . |
| 5,333,245 | 7/1994 | Vecchione ................................ 395/130 |
| 5,339,387 | 8/1994 | Frankel . |
| 5,392,385 | 2/1995 | Evangelisti et al. . |
| 5,420,971 | 5/1995 | Westerink et al. . |
| 5,438,651 | 8/1995 | Suzuki et al. . |
| 5,479,590 | 12/1995 | Lin . |
| 5,557,339 | 9/1996 | Dadourian . |
| 5,581,665 | 12/1996 | Sugiura et al. ........................... 395/86 |
| 5,592,599 | 1/1997 | Lindholm ................................ 395/127 |
| 5,596,687 | 1/1997 | Peters, Jr. . |
| 5,644,364 | 7/1997 | Kurtze et al. . |
| 5,710,876 | 1/1998 | Peercy et al. ........................... 395/126 |
| 5,715,385 | 2/1998 | Stearns et al. ........................... 395/136 |
| 5,754,180 | 5/1998 | Kivolowitz et al. . |
| 5,774,132 | 6/1998 | Uchiyama ............................... 345/503 |
| 5,808,623 | 9/1998 | Hamburg ............................... 345/433 |
| 5,835,099 | 11/1998 | Maromont .............................. 345/431 |
| 5,867,166 | 2/1999 | Myhrvold et al. ...................... 345/419 |

FOREIGN PATENT DOCUMENTS

| | | |
|---|---|---|
| 0 447 222 A2 | 9/1991 | European Pat. Off. . |
| 0 494 325 A1 | 7/1992 | European Pat. Off. . |
| 0 512 839 A2 | 11/1992 | European Pat. Off. . |
| 0 517 035 A2 | 12/1992 | European Pat. Off. . |

OTHER PUBLICATIONS

T. Kohonen, Content–Addressable Memories, Date Unknown, pp. 19–27, Springer Series in Information Sciences, Second Edition.

D. Ghazanfarpour and B. Peroche, A High–Quality Filtering Using Forward Texture Mapping, 1991, pp. 569–577, Comput. & Graphics vol. 15, No. 4.

John Buchanan, The Filtering of 3D Textures, 1991, pp. 53–60, Graphics Interface.

Ghazanfarpour et al., "A High–Quality Filtering Using Forward Texture Mapping", Computers and Graphics, pp. 569–577, Jan. 1, 1991.

Feibush et al., Synthetic Texturing Using Digital Filters, Computer Graphics 1980, pp. 294–301.

(List continued on next page.)

*Primary Examiner*—Matthew Luu
*Assistant Examiner*—Jeff Piziali
*Attorney, Agent, or Firm*—Wolf, Greenfield & Sacks, P.C.

[57] ABSTRACT

A source image may be manipulated by a computer to include special graphics effects. The source image may be used for still pictures or motion video applications and may include a single image or a sequence of images. The special graphics effects applied to the source image to create a desired destination image include various non-uniform scaling or arbitrary distortion functions. The effect has a corresponding affine transformation that approximates the non-uniform scaling function. This affine transformation is used to define an ellipse in the source image. A linear transformation from a unit circle in the source image to the ellipse in the source image is calculated. The linear transformation is used to modify a reconstruction filter in the source image. A pixel value in the destination image is determined by identifying pixels included in a support of the modified reconstruction filter in the source image in order to reduce artifacts in non-uniform scaling applications.

69 Claims, 5 Drawing Sheets

OTHER PUBLICATIONS

Oka et al., Real–Time Manipulation of Texture–Mapped Surfaces, Computer Graphics, vol. 21, No. 4, Jul. 1987, pp. 181–188.

Blinn et al., Texture and Reflection in Computer Generated Images, Communications of the ACM, Oct. 1976, vol. 19, No. 10, pp. 542–547.

Catmull et al., 3–D Transformations of Images in Scanline Order, Computer Graphics, 1980, pp. 279–285.

Franklin C. Crow, Summed–Area Tables for Texture Mapping, Computer Graphics 1984, pp. 207–212.

Gangnet et al., Perspective Mapping of Planar Textures, Computers and Graphics, vol. 8, No. 2, 1984, pp. 115–123.

Andrew Glassner, Adaptive Precision in Texture Mapping, Computer Graphics, Dallas, Aug. 18–vol. 20, No. 4, 1986, pp. 297–306.

Paul S. Heckbert, Filtering by Repeated Integration, Computer Graphics, Dallas, Aug. 18–22, vol. 20, No. 4, 1986, pp. 315–321.

Alvy Ray Smith, Planar 2–Pass Texture Mapping and Warping, Computer Graphics, vol. 21, No. 4, Jul. 1987, pp. 263–272.

Lance Williams, Pyramidal Parametrics, Computer Graphics, vol. 17, No. 3, Jul. 1993, pp. 1–11.

APPARATUS AND METHOD FOR NON-UNIFORM IMAGE SCALING

FIELD OF THE INVENTION

The invention relates to graphics editing, and more particularly to determining a pixel value in an image produced by a special effect which includes a function that performs non-uniform scaling or arbitrary distortion of a source image function.

BACKGROUND OF THE INVENTION

In many computer graphics applications, an image displayed on a two-dimensional display screen is generated by transforming another image, called a source image. For example, the source image may be texture mapped to a three-dimensional object which is projected onto a two-dimensional plane defined by the display. Another application includes special effects in motion video or animation in which a source image is deformed to create a desired image.

The source image can be represented by a rectangular grid of samples of a continuous 2-D function f(x,y). Each sample is the value of the continuous function at a given sample point or pixel, with each pixel representing a point of the image, including the color of the image at that point. An ideal procedure for scaling the image, i.e., an image represented as discrete pixel locations along fixed scan lines in a rectangular array of scan lines, involves reconstructing the original continuous function of the source image from the sampled data and then deforming the continuous image. A low pass filter is applied to eliminate frequencies in the destination image above a Nyquist frequency. The Nyquist frequency determines the lowest sampling rate possible to preserve details in the image and is equal to twice the frequency of the highest frequency component in a source signal. The low pass filter is used since any frequency component that is higher than half the sampling rate will be sampled incorrectly and will be aliased to a lower frequency. After applying the filter, sampling is performed on the continuous function of the deformed image using a different sampling resolution to produce a destination image. According to sampling theory, the sinc function $f(x,y)=[\sin(\pi x)\sin(\pi y)]/\pi^2 x$, is ideal for reconstructing a two-dimensional image. Sampling would determine the color value of each point in the destination to create the final destination image. The entire process of reconstructing, deforming, filtering and sampling is known as resampling.

However, in practice, the ideal process as outlined above is impractical, primarily because an ideal reconstruction filter cannot be implemented practically. For instance, since the sinc function is nonzero on points arbitrarily far from the origin, performing computations on all points is impractical. Therefore, a finite reconstruction filter is used, such as bilinear and bicubic filters are often used for filtering the signal representing a source image. In addition, an actual continuous image cannot be represented in a computer environment and a continuous image cannot be easily distorted.

One way to simulate the ideal process includes applying a transformation to regularly spaced pixels from a source image and then applying a low pass filter to the transformed image. However, after the transformation is applied, the transformed image may no longer include regularly spaced points and applying a low pass filter to the irregularly spaced points is difficult to perform.

In conventional systems, scaling down may be performed using mip-mapping techniques. In mip-mapping, although a standard shape of a square is used in filtering, the area of the filter may vary. A source image is successively averaged down to a lower resolution. Each image is half the resolution of the previous image, i.e., half the linear dimension and a quarter the number of samples of its previous image. Using bilinear interpolation, an intensity is determined for values of each pixel as it is scaled down. Linear interpolation between levels of filtering further smooths the values. However, in motion video applications, mip-mapping may produce undesired artifacts.

Standard box filtering may also be used for mapping an image. A rectangular box corresponding to the approximate shape of the destination pixel may be used to compute a filtered pattern value for the pixel by summing all of the values in the source image included in the rectangle. Each destination pixel has a value that is a weighted average of an area of source pixels. However, if the transformed pixel is not approximately an aligned rectangle, then undesired artifacts may result in the destination image.

The problem of undesired artifacts may be particularly troublesome when an image is non-uniformly scaled, i.e., is subject to an arbitrary deformation. These artifacts arise particularly when applying special effects to an image which involves altering at least one portion of the image differently from other portions of the image. Two examples of a non-uniform special effect scaling include sphere and ripple. When applying a ripple effect, the resulting image includes a ripple pattern, such as one resulting from throwing a stone in a lake. Applying the sphere effect creates an enlarged lateral portion of a sphere, i.e., a "bulge", while maintaining the surrounding image in the sphere.

A need exists for a system or process for transforming a source image to a destination image which approximates the ideal resampling process and eliminates the artifacts caused by conventional filtering methods used with non-uniform scaling applications.

SUMMARY OF THE INVENTION

The present invention approximates an ideal resampling process by using a reconstruction filter which has been modified by a linear transformation. The modified reconstruction filter is applied in the source image in order to determine values for pixels in the destination image. By applying a modified reconstruction filter in the source image, artifacts caused by resampling a filtered source image are reduced.

One aspect of the present invention is a process for obtaining a pixel value in a destination image produced by non-uniform scaling. A reconstruction filter is chosen and a unit circle centered on a pixel in a destination image is determined. An affine transformation function determined by the non-uniform scaling is performed on the unit circle to define at least two orthogonal axes in a source image. A linear transformation between a unit circle in the source image space and the orthogonal axes is determined. The linear transformation is then applied to the reconstruction filter. The pixels from the source image space which are included in the modified reconstruction filter are then identified. A value for a pixel in a destination image is determined from the pixels included in the support of the selected reconstruction filter.

Other aspects of the present invention include a computer system that implements this process, and other systems and processes as set forth below and in the appended claims.

DETAILED DESCRIPTION

Figure 1:
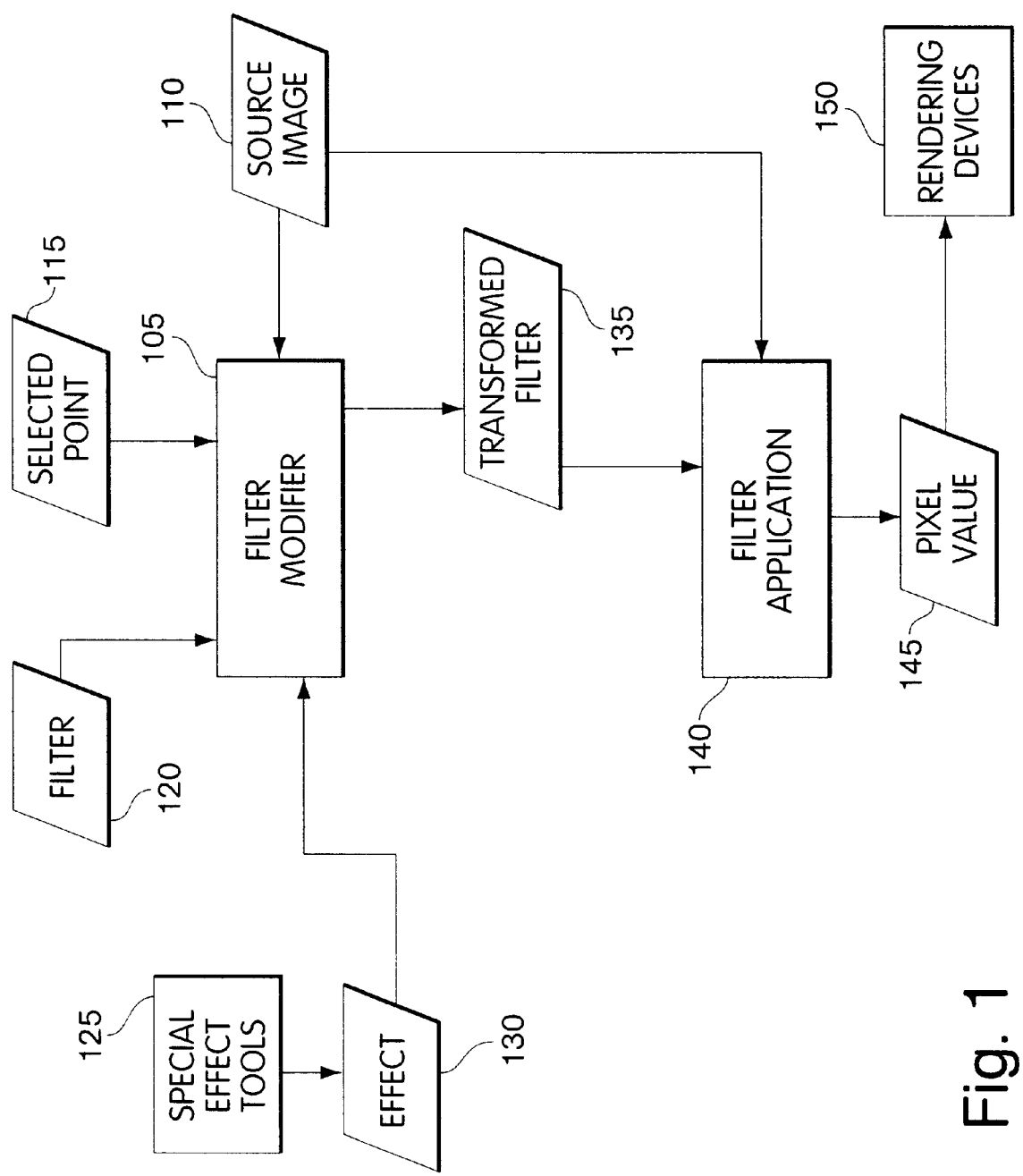
FIG. 1 is a block diagram of a system for processing non-uniform scaling of images in accordance with an embodiment of the present invention.

The present invention will be more completely understood through the following detailed description which should be read in conjunction with the attached drawings in which similar reference numbers indicate similar structures.

The present invention approximates an ideal resampling process by using a reconstruction filter which has been modified by a linear transformation. The modified reconstruction filter is applied in the source image in order to determine values for pixels in the destination image. By applying a modified reconstruction filter in the source image, artifacts caused by resampling a filtered source image are reduced.

This process will now be described generally in connection with FIG. 1 and will be described in more detail below in connection with FIGS. 3, 4 and 5. Special effect tools module 125 creates an effect which includes non-uniform scaling. Various tools may be used to define such effects. The effect data 130 may be stored for future use, or may be sent to filter modifier 105. Filter modifier 105 receives a selected filter 120, a selected pixel 115 in a destination image, and data 130 indicating the effect to be applied to a source image 110. The filter modifier 105 modifies the selected filter 120 according to a relationship, defined by the effect 130, between the selected pixel 115 and a point in the source image 110 to create a transformed filter 135. The filter application module 140 applies the modified filter 135 to the source image 110 to obtain a pixel value 145 in the destination image. The pixel value 145 is outputted to a rendering device 150 to display the destination image.

Figure 2:
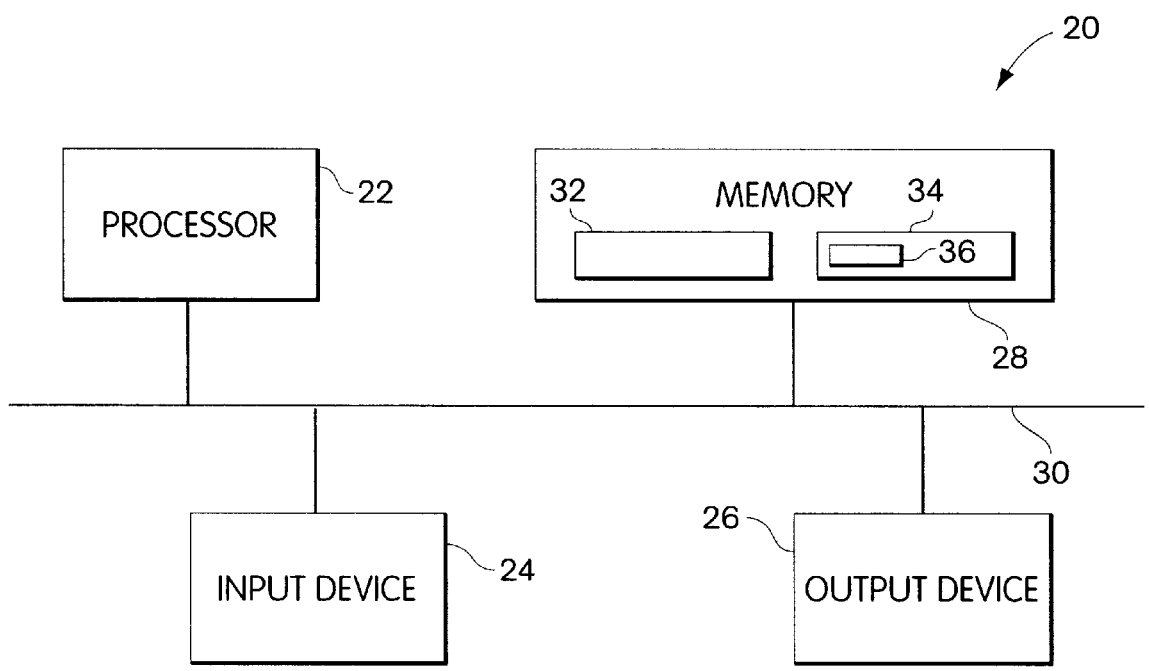
FIG. 2 is a block diagram of a general purpose computer suitable for an embodiment of the invention.

The present invention may be implemented using a general purpose computer that is programmed to generate, with reduced artifacts, a destination image by non-uniformly scaling a source image. An example computer system is shown in FIG. 2. In particular, the apparatus as shown in FIG. 2 includes a general purpose computer 20 having a processor 22, an input device 24, an output device 26, and memory 28 connected together through a computer bus 30. The memory 28 includes primary memory 32 (i.e., fast volatile memory such as dynamic semiconductor memory) and secondary memory 34 (i.e., nonvolatile memory such as magnetic disks). The memory 28 stores one or more programs 36 that, when executed by the processor 22, effect a transformation from a source image to a destination image. The input device 24 receives commands from a graphics editor, and the output device 26 displays results of the transformed image to the graphics editor. The results of the transformed image can be stored in memory 28 for future use.

It should be understood that one or more output devices may be connected to the computer 20. Example output devices 26 include various imaging devices including a cathode ray tube (CRT) display, a liquid crystal display (LCD), printers, and communication devices such as a modem. One or more input devices 24 may be connected to the computer system. Example input devices include a keyboard, keypad, track ball, mouse, pen and tablet, communication device and scanner. It should be understood the invention is not limited to the particular input or output devices used in combination with the computer system 20 or to those described herein. Also, the invention is not limited to a particular computer platform, particular processor or particular high-level programming language. Additionally, the computer system 20 may be a multiprocessor computer system or may include multiple computers connected over a computer network.

Figure 3:
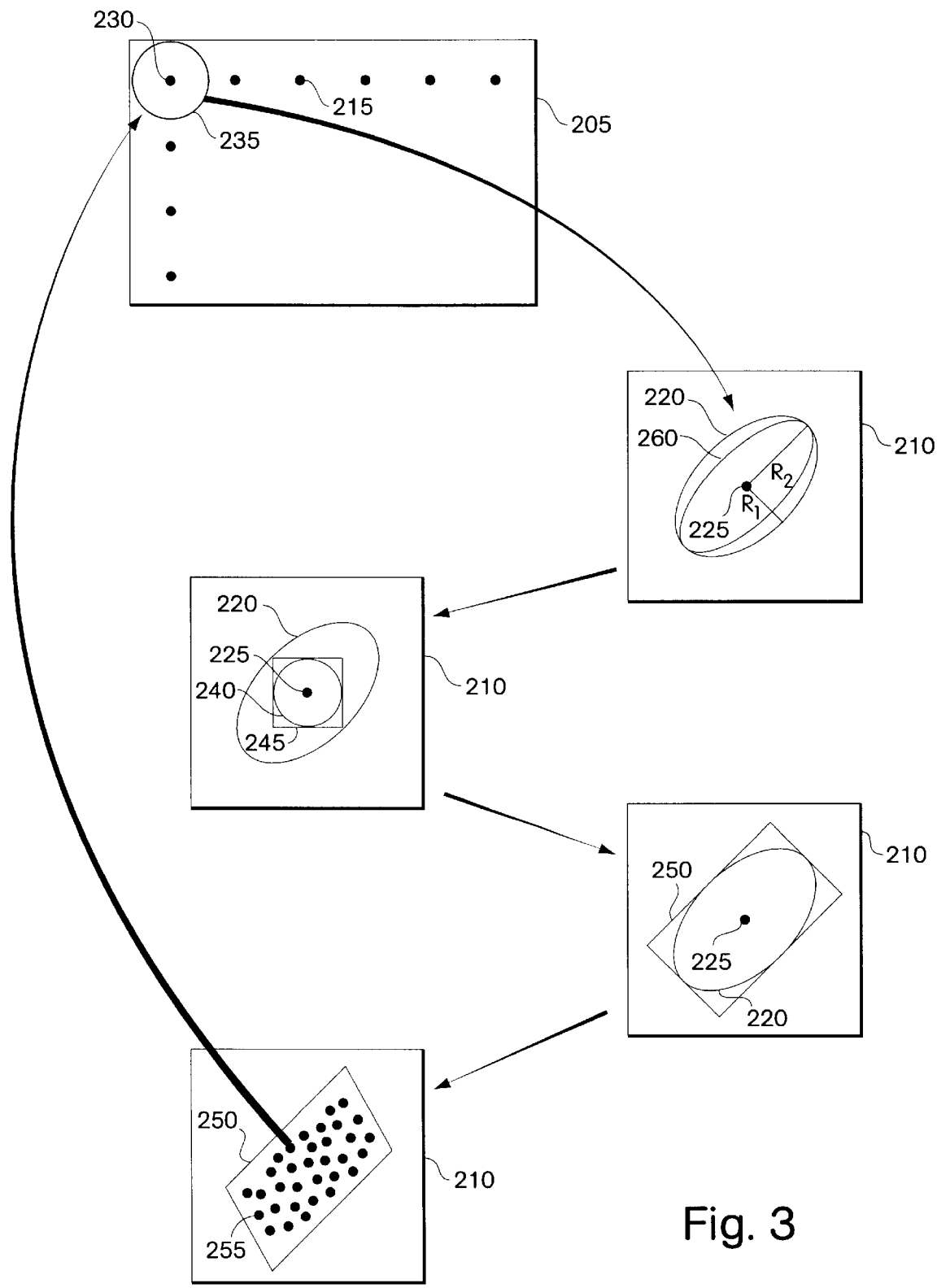
FIG. 3 is a functional diagram of the process of an embodiment of the present invention.

Referring now to FIG. 3, a general example illustrating principles of a process in accordance with the present invention will now be described. In this process, a pixel value in a destination image 205 is determined according to non-uniform scaling of a source image 210. Non-uniform scaling may include any deformation of the source image. Such scaling may be used for enhancing graphics either in still pictures, e.g., a high quality poster, or in motion videos, e.g., video games, movies, etc., and may include two-dimensional or three-dimensional special effects. Three-dimensional effects may include arbitrary deformation of a source image by mapping a two-dimensional source image into another two-dimensional image. In particular, this may include arbitrary deformation by mapping onto a three-dimensional surface followed by orthographic or perspective projection. The two-dimensional special effects to be applied using non-uniform scaling of an image may include sphere, ripple, twirl, page turn, warp, tumble, flag wave or pinch effects, or any deformation determined by a function from one plane to another plane.

In FIG. 3, both destination image 205 and source image 210 may be considered as a set of samples, called points or pixels, in a two-dimensional plane, where each sample has coordinates in the plane and a value indicative of its color. It should be understood that the invention also applies to black and white images. The destination image 205 and source image 210 may have an arbitrary shape and size. A point 225 in the source image 210 may contribute to the value of a point, e.g., 215 or 230, in the destination image 205, according to the deformation to be applied to the source image 210.

For any arbitrary deformation of the source image 210, an affine transformation can be defined that maps a point 230 in the destination image 205 to a point 225 in the source image 210. Similarly, this affine transformation maps a unit circle 235 centered about point 230 in the destination image to an ellipse 260 in the source image 210. The length and direction of the orthogonal axes of the ellipse 260 may be determined using this affine transformation. When the length of one of the axes is greater than two units, the deformation to be applied to the source implies low pass filtering should occur in the direction of that axis. If the length of the axis is less than two, no low pass filtering should occur in the direction of that axis, and the length of that axis may be assumed to be one, as shown at 220. A unit is the distance between two adjacent pixels in the source image 210. Given the length and direction of the orthogonal axes $R_1$ and $R_2$ of the ellipse 220, a linear transformation is determined which maps a unit circle 240 concentric with the ellipse 220 into the ellipse 220. A desired reconstruction filter 245, e.g., a bilinear or bicubic filter, also concentric with the unit circle 240 is modified according to this linear transformation. This modified reconstruction filter is represented at 250. Pixels 255 of the source image 210 that fall within the modified reconstruction filter 250 are used to determine a pixel value for point 230 in destination image 205.

One embodiment of the process described above in connection with FIG. 3 will now be described in more detail in connection with FIG. 4. This process starts in step 305 with selection of a special effect involving non-uniform scaling or arbitrary deformation of an image, which may be input to computer 20 (FIG. 2). The special effect may be a two-dimensional or three-dimensional effect, such as described above, which is used to transform a source image 210 into a destination image 205. Predetermined special effects may be stored in memory 28 (FIG. 2) and may be selected according to user input into computer 20 (FIG. 2). Example arbitrary deformation functions include mapping a two-dimensional source image to a three-dimensional surface, such as in texture mapping, and then projecting the surface as a two-dimensional destination image. Another kind of arbitrary deformation function is an inverse perspective transformation into three-dimensional space followed by a mapping back into two-dimensional space. Other functions which scale an image non-uniformly also may be used.

A reconstruction filter is chosen in step 310. The filter may be selected from predetermined functions stored in memory 28, which also may have user selectable parameters. Example reconstruction filters include bilinear filters, bicubic filters and box filters. In the example shown in FIG. 3, the reconstruction filter is a bilinear filter.

A value for a pixel in the destination image 205 is then determined through steps 315 through 350 which will now be described. In step 315, a point 230 in the destination image 205 is selected. The point may be the center of a pixel in the destination image, or may be an arbitrary point in the destination image space which is in turn used to compute the value of a particular pixel. The coordinates of the selected point 230 are used to define an affine transformation that maps a unit circle 235 centered around the selected point 230 into an ellipse 260 in the source image. This affine transformation locally approximates and represents the inverse of the arbitrary deformation function that implements the special effect selected in step 305.

In one embodiment, the affine function is represented by coordinate functions $u_A(x,y)$ and $v_A(x,y)$ which map a point $(x,y)$ in the destination image to a point $(u,v)$ in the source image space. Assuming $u_A(x,y)$, $v_A(x,y)$ have partial derivatives at $(x_o, y_o)$, point 230, the affine transformation representing the arbitrary differentiable function from $(x,y)$ to $(u,v)$ is:

$$u_A(x, y) = u(x_o, y_o) + \frac{\partial u}{\partial x}(x_o, y_o)(x - x_o) + \frac{\partial u}{\partial y}(x_o, y_o)(y - y_o) \quad \text{(Eq. 1)}$$

$$v_A(x, y) = v(x_o, y_o) + \frac{\partial v}{\partial x}(x_o, y_o)(x - x_o) + \frac{\partial v}{\partial y}(x_o, y_o)(y - y_o) \quad \text{(Eq. 2)}$$

Here $$\frac{\partial u}{\partial x}$$

is the partial derivative of $u(x,y)$ with respect to x; and $$\frac{\partial u}{\partial x}$$

$(x_o, y_o)$ is that partial derivative evaluated at $(x_o, y_o)$, resulting in a numeric value.

In step 320, the ellipse 260 is defined in the source image 210 by computing, using the affine transformation, the length and direction of its orthogonal axes. Given an arbitrary deformation from source image space to destination image space, a point $(x_0, y_0)$ in the destination image space, and given a local inverse deformation with coordinate functions $u(x,y)$, $v(x,y)$, it is possible to compute axis directions $(u_1, v_1)$, $(u_2, v_2)$ and magnitudes $R_1, R_2$ for the ellipse 220 which is the image under the inverse deformation of the unit circle 235 centered at $(x_o, y_o)$, point 230.

The functions $u(x,y)$, $v(x,y)$ may have well-defined partial derivatives at $(x_o, y_o)$ which may be used to define values a, b, c, d as:

$$a = \frac{\partial u}{\partial x}(x_o, y_o) \quad \text{(Eq. 3)}$$

$$b = \frac{\partial v}{\partial x}(x_o, y_o) \quad \text{(Eq. 4)}$$

$$c = \frac{\partial u}{\partial y}(x_o, y_o) \quad \text{(Eq. 5)}$$

$$d = \frac{\partial v}{\partial y}(x_o, y_o) \quad \text{(Eq. 6)}$$

If $a=b=c=d=0$, then $R_1=R_2=0$, and $(u_1,v_1)=(1,0)$, $(u_2,v_2)=(0,1)$. Otherwise, if $ad-bc=0$, then $$R_1 = \sqrt{a^2 + b^2 + c^2 + d^2}, \, R_2 = 0. \quad \text{(Eq. 7)}$$

Since one of a, b, c, d is non-zero, either $a^2+b^2$ or $c^2+d^2$ is non-zero. If $a^2+b^2$ is non-zero, then $$(u_1, v_1) = \left( \frac{a}{\sqrt{a^2 + b^2}}, \frac{b}{\sqrt{a^2 + b^2}} \right), \quad \text{(Eq. 8)}$$

$$(u_2, v_2) = \left( \frac{-b}{\sqrt{a^2 + b^2}}, \frac{a}{\sqrt{a^2 + b^2}} \right), \quad \text{(Eq. 9)}$$

If $c^2+d^2$ is non-zero, then $$(u_1, v_1) = \left( \frac{c}{\sqrt{c^2 + d^2}}, \frac{d}{\sqrt{c^2 + d^2}} \right), \quad \text{(Eq. 10)}$$

$$(u_2, v_2) = \left( \frac{-d}{\sqrt{c^2 + d^2}}, \frac{c}{\sqrt{c^2 + d^2}} \right). \quad \text{(Eq. 11)}$$

Otherwise, the axes are computed as follows:

$$A = \frac{b^2 + d^2}{(ad - bc)^2} \quad \text{(Eq. 12)}$$

$$B = -2ab + \frac{cd}{(ad - bc)^2} \quad \text{(Eq. 13)}$$

-continued $$C = \frac{a^2 + c^2}{(ad - bc)^2} \quad \text{(Eq. 14)}$$

$$\lambda = \frac{A - C + \sqrt{(A-C)^2 + B^2}}{2} \quad \text{(Eq. 15)}$$

$$\text{If } \lambda = 0, R_1 = \sqrt{\frac{1}{A}} \quad \text{(Eq. 16)}$$

$$R_2 = \sqrt{\frac{1}{C}} \; (u_1, v_1) = (1, 0), (u_2, v_2) = (0, 1) \quad \text{(Eq. 17)}$$

Otherwise, the following value is computed:

$$\mu = \frac{4\lambda^2(A + C)}{B^2 + 4\lambda^2}; \quad \text{(Eq. 18)}$$

$$\text{Then } R_1 = \frac{2\sqrt{2} \; \lambda}{\sqrt{B^2 + 4\lambda^2} \sqrt{\mu + \lambda}} \quad \text{(Eq. 19)}$$

$$R_2 = \frac{2\sqrt{2} \; \lambda}{\sqrt{B^2 + 4\lambda^2} \sqrt{\mu - \lambda}} \quad \text{(Eq. 20)}$$

and $$(u_1, v_1) = \left( \frac{2\lambda}{\sqrt{B^2 + 4\lambda^2}}, \frac{B}{\sqrt{B^2 + 4\lambda^2}} \right), \quad \text{(Eq. 21)}$$

$$(u_2, v_2) = \left( \frac{B}{\sqrt{B^2 + 4\lambda^2}}, \frac{2\lambda}{\sqrt{B^2 + 4\lambda^2}} \right). \quad \text{(Eq. 22)}$$

After the ellipse 260 is defined by determining $R_1$, $R_2$, $(u_1, v_1)$ and $(u_2, v_2)$, the ellipse 260 is stretched, in step 325, along its axes to make the axes at least two units in length to produce stretched ellipse 220. In particular, if either $R_1$ or $R_2$ has a value less than 1, then its value is set to 1.

The axes of the ellipse 220 then have a length $2R_1$ and $2R_2$ in the directions defined by vectors $(u_1,v_1)$ and $(u_2,v_2)$, respectively, where $R_1$ and $R_2$ are the half lengths of first and second orthogonal axes, respectively, of the ellipse 220. Therefore, the axes of the ellipse are defined by vectors $(R_1 u_1, R_1 v_1)$ and $(R_2 u_2, R_2 v_2)$.

Next, in step 330, a linear transformation from a unit circle 240 concentric with ellipse 220 to the ellipse 220 then is determined. The simplest linear transformation from the unit circle 240 to the ellipse 220 maps unit vectors (1,0) and (0,1) to vectors $(R_1 u_1, R_1 v_1)$ and $(R_2 u_2, R_2 v_2)$, respectively, and has coordinate functions u'(u,v), v'(u,v) as follows:

$$u'(u,v) = R_1 u_1 u + R_2 u_2 v \quad \text{(Eq. 23)}$$

$$v'(u,v) = R_1 v_1 u + R_2 v_2 v \quad \text{(Eq. 24)}$$

where u and v are coordinates in the source image with (u,v)=(0,0) the origin of the ellipse 220. The affine transformation used to create the ellipse 220 may introduce a rotational or skew component in any transformation between the unit circle 240 and the ellipse 220. The linear transformation shown in Equations 23 and 24 has a rotational component, but no skew component.

A linear transformation that removes both skew and rotational components also may be defined. An example of such a linear transformation maps $(u_1,v_1)$ to $(R_1 u_1, R_1 v_1)$ and $(u_2,v_2)$ to $(R_2 u_2, R_2 v_2)$ using coordinate functions as follows:

$$u'(u,v) = ((R_1 u_1 v_2 - R_2 u_2 v_1)u - (R_1 - R_2)u_1 u_2 v)/(u_1 v_2 - v_1 u_2) \quad \text{(Eq. 25)}$$

$$v'(u,v) = ((R_1 - R_2)v_1 v_2 u - (R_1 u_2 v_1 - R_2 u_1 v_2)v)/(u_1 v_2 - v_1 u_2) \quad \text{(Eq. 26)}$$

These transformations treat the center of the ellipse 220 as the origin in the source image space. A translation to the actual coordinates may be performed by adding appropriate offsets to Equations 25 and 26 or to the application of its inverse in steps 340 to 345 below.

Next, in step 335, the selected reconstruction filter 245 centered around the origin 225 is modified to obtain a new reconstruction filter 250 centered about the origin 225 by defining a filter that first applies the inverse of the linear transformation to the coordinates of a point and then filters those points with the original selected reconstruction filter 245. Note that the modified filter and the original filter may be the same if the linear transformation is a unity transformation, which simplifies the processing of steps 340 and 345 described below. If the size of the selected reconstruction filter when centered on the unit circle 240 includes the area of the unit circle, then the modified reconstruction filter includes the entire ellipse 220, as shown. However, the selected reconstruction filter 245 may be included within the unit circle 240, such as a box filter with a radius of one-half. Since the filter 245 in that case is smaller than the unit circle 240, then the modified filter 250 is smaller than the ellipse 220.

In step 340, the pixels 255 in the source image 210 included in the area defined by the modified reconstruction filter 250 are identified. This support area of the reconstruction filter includes any pixels where the filter is non-zero. Several methods may be used to identify the pixels with centers included in the support of the transformed filter 250. In one embodiment, a rectangular bounding box which includes the support of the modified filter is defined. This bounding box may be defined by applying the linear transformation determined in step 330 to the coordinates of the four corners of the filter. For each pixel in the source image with a center inside the bounding box, the inverse of Equations 25 and 26 is applied to its coordinates to obtain transformed coordinates in the source image space. If the transformed coordinates of the pixel lie inside of the support of the original unmodified filter in the source image space, then the pixel is within the support of the modified filter.

In another embodiment, only those pixels with centers in the support of the modified filter are identified, with the support defined by a polygon. Then a standard polygon rasterizing technique, such as using the Bresenham line drawing algorithm along the sides of the polygon may be used. The pixels which lie between the left and right lines are then identified and the inverse of the linear transform of Equations 25 and 26 is applied to the coordinates of each pixel to obtain transformed coordinates in the source image space. If the transformed coordinates of the pixel lie inside of the support of the original unmodified filter in the source image space, then the pixel is within the support of the modified filter.

The values, such as color and intensity, of pixels 255 included in the support of modified reconstruction filter 250 are then used to determine a pixel value for the selected pixel 230 in destination image 205, in step 345. In one embodiment, the color value of each pixel within the support of the reconstruction filter is scaled by a corresponding value from the original unmodified filter. These scaled values are averaged to provide a color value for the selected pixel 230 in the destination image.

If a value for each pixel in destination image 205 has been calculated, as determined in step 350, then the process ends and the destination image 205 is rendered in step 355. Otherwise a next pixel is selected and the process continues with step 315 as described above.

Figure 4:
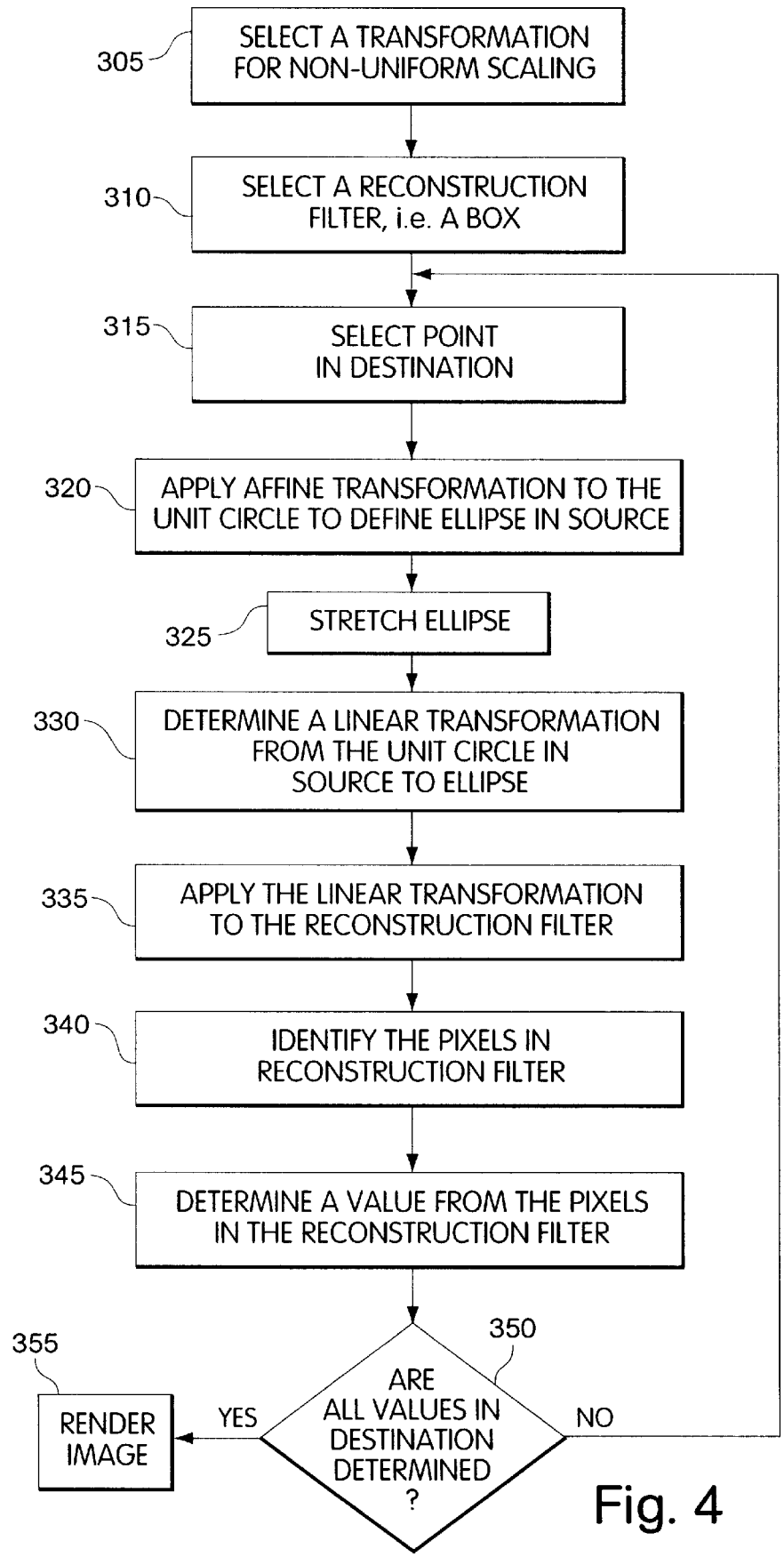
FIG. 4 is a flowchart of the process of an embodiment of the present invention.
Figure 5:
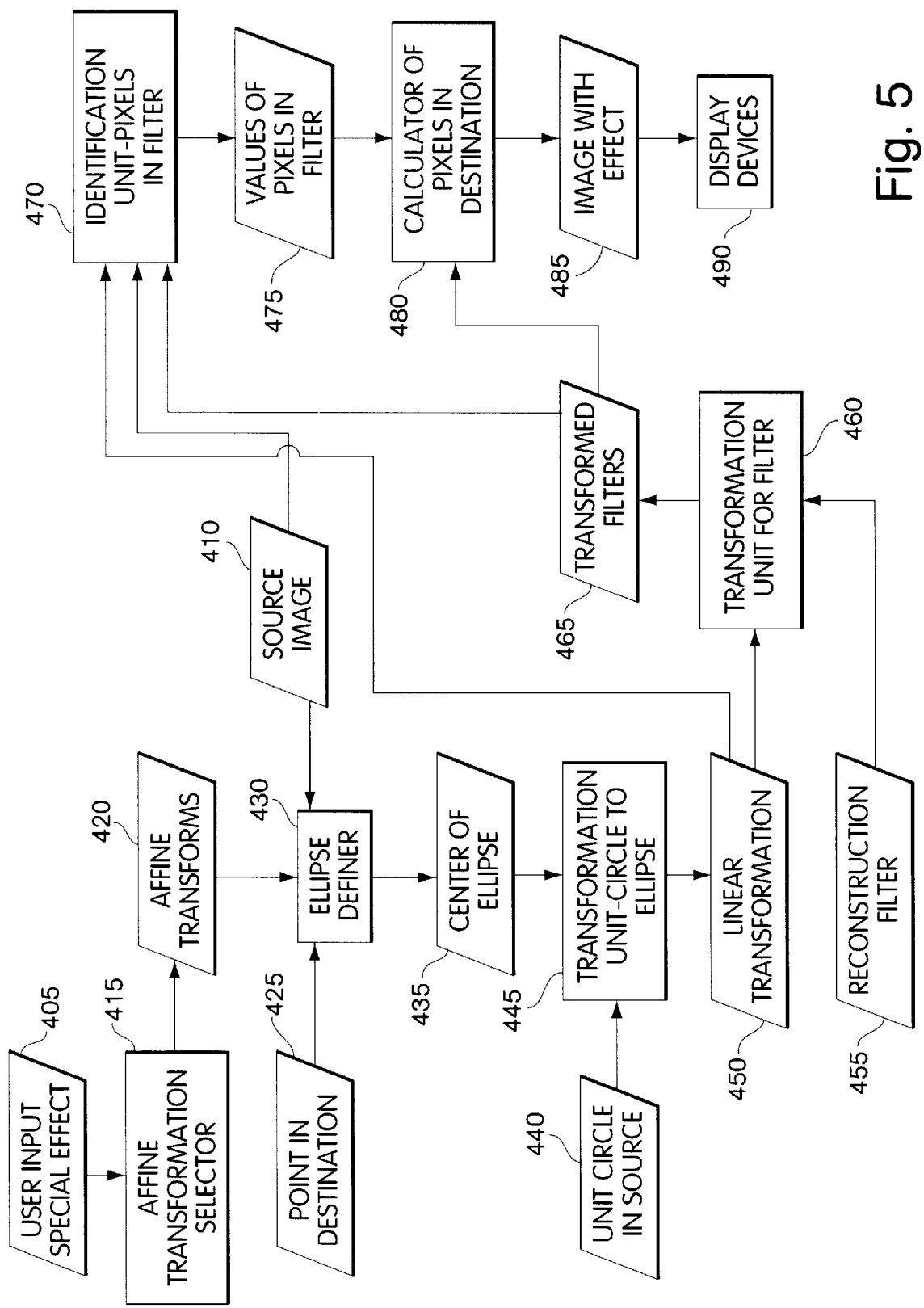
FIG. 5 is a block diagram of a system for processing non-uniform scaling of images in accordance with an embodiment of the present invention.

FIG. 5 illustrates a corresponding system that implements the embodiment described by the flowchart of FIG. 4, and illustrates in more detail one embodiment of the system of FIG. 1. This system may be implemented using a high-level computer programming language on a computer system, such as described above in FIG. 2. In this system, an affine transformation selection module 415 receives user input 405 typically via a graphical user interface. The user input 405 includes an indication of a desired special effect to be achieved that performs non-uniform scaling or arbitrary deformation. Given a specified special effect 405, an affine transformation 420 is generated or retrieved, which represents and approximates the arbitrary deformation of the special effect. How such an affine transformation is generated is well known in the art. The affine transformation 420 may be stored in memory.

The ellipse definer 430 receives an indication of a point 425 identified in the destination image and a source image 410 and uses the affine transformation 420 to define an ellipse in the source image 410 which corresponds to a transformed unit circle defined about point 425. The ellipse is defined to have axes of at least two units in length as described above. An indication of the center 435 of the defined ellipse, and the length and direction of its orthogonal axes is output by the ellipse definer 430 to transformation unit 445. The transformation unit 445 defines a linear transformation between a unit circle 440 in the source image around the defined center of the ellipse 435 and the ellipse. Such a linear transformation is described above. The linear transformation 450 required to scale the unit circle 440 may be stored in memory for later use.

A reconstruction filter 455, as described above, is input along with an indication of the linear transformation 450 to a filter transformation unit 460. The unit 460 outputs a modified filter 465 as described above in step 335 of FIG. 4. The modified filter may be stored in memory and applied to other source images. The identification unit 470 determines which pixels in the source image are included in the domain or support of the modified filter 465. The identification unit 470 may use various methods to determine which pixels are included in the support of the modified filter, as discussed above in reference to step 340 of FIG. 4. The values of the pixels 475 in the source image included in the support of the filter 465 are stored in memory. A calculator unit 480 receives pixel values 475 to determine the value of a point in a destination image. The calculator unit may use any of variety of functions to make this determination. For example, the values for the pixels in the support of the filter may be filtered then averaged to determine the pixel value for the destination image 485. A display device 490 displays the non-uniformly scaled image.

The process and apparatus of the present invention may be applied to resample an image of three dimensions or higher. In such applications, a unit circle 240 (FIG. 3) in the source image 210 is an N-dimensional sphere and an ellipse 220 in the source image 210 is an N-dimensional ellipsoid. The source image, such as image 210 may be a three-dimensional image including volumetric data such as that used for medical imaging or weather applications. The source image 210 may also be a four-dimensional image, which would include, for example, a three-dimensional image changing over time. In addition, the source image in any dimension may be a single image or it may be a sequence of images.

Another embodiment of the present invention includes optimizing the resampling process shown in FIG. 3. Since the non-uniform scaling of the source image is performed by an arbitrary function, the ellipse computations for each pixel of the destination image may be too time consuming and expensive for some applications. Therefore, the process as shown in FIGS. 3 and 4 may be optimized to approximate the arbitrary scaling using a piecewise approach. In this embodiment, rather than identifying an individual pixel, a plurality of triangles may be defined in the destination image. Each triangle would represent a collection of points in the destination image. The vertices of each triangle are then used to determine the non-uniform scaling function from the destination image to the source image. An affine transformation representing the non-uniform scaling function of each vertex, and therefore an affine transformation on each individual triangle, based on each vertex, is performed to define an ellipse in a source image. The affine transformation represents the non-uniform scaling function of the source image and the ellipse calculations are performed one time per triangle, and thus is applied to several pixels at a time. The linear transformation performed to transform a unit circle centered around a center point of an ellipse to the ellipse is then applied to the reconstruction filter.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A process for obtaining a value for a pixel in a destination image produced by non-uniform transformation of a source image, comprising the steps of:

selecting a reconstruction filter;

applying an affine transformation determined by the non-uniform transformation on an area centered on the pixel in the destination image to define at least two axes in a source image space;

determining a linear transformation between an area in the source image space and the at least two axes, wherein the linear transformation corresponds to the non-uniform transformation and represents the shape of the area in the destination image transformed by a transformation defined according to the inverse of the non-uniform transformation, wherein the area is centered around a center of the at least two axes;

modifying the selected reconstruction filter using the linear transformation to create a modified reconstruction filter with a support region;

identifying which pixels from the source image are included in the support region of the modified reconstruction filter; and determining the value for the pixel in the destination image from pixel centers of the source image included in the support of the modified reconstruction filter.

2. A process as claimed in claim 1, wherein the identifying step further includes:

creating a rectangular bounding box which includes the support of the modified filter;

applying an inverse transformation to coordinates of each pixel with a center inside the bounding box; and determining whether the coordinates are included in the support of the unmodified selected reconstruction filter.

3. A process as claimed in claim 1, wherein the determining a value step includes:
multiplying a color value of each pixel included in the support of the modified filter by the value from the untransformed selected reconstruction filter;
determining a weighted average of the pixel values included in the modified filter.

4. A process as claimed in claim 1, wherein the identifying step further includes:
determining pixels with centers in the support of the modified filter by treating the support of the transformed filter as a polygon; and
using a polygon rasterizing technique.

5. A process as claimed in claim 1, wherein the affine transformation step is performed for a plurality of pixels.

6. A process as claimed in claim 1, wherein the performing an affine transformation step includes approximating the non-uniform transformation for implementing two-dimensional special effects by a function.

7. A process as claimed in claim 1, wherein the performing an affine transformation step includes approximating the non-uniform transformation for implementing three-dimensional effects by a function.

8. A process as claimed in claim 1, wherein the determining a linear transformation step includes removing a skew component.

9. A process as claimed in claim 1, wherein the determining a linear transformation step includes removing a skew and a rotational component.

10. A process as claimed in claim 1, wherein the performing an affine transformation step is followed by performing a perspective projection.

11. A destination image produced by the process of non-uniformly transforming a source image performed by a process that includes:
modifying a reconstruction filter according to a linear transformation corresponding to the non-uniform transformation function; and
applying the modified reconstruction filter to the source image by identifying pixels of the source image included in a support of the modified reconstruction filter and using the value of each of the identified pixels to determine the value of a destination pixel to produce the destination image.

12. A destination image as claimed in claim 11, wherein the source image includes a two-dimensional data set.

13. A destination image as claimed in claim 11, wherein the source image includes a three-dimensional volumetric data set.

14. A destination image as claimed in claim 11, wherein the source image includes a single image.

15. A destination image as claimed in claim 11, wherein the source image includes a sequence of images.

16. A destination image as claimed in claim 11, wherein the reconstruction filters include bilinear or bicubic functions.

17. A destination image as claimed in claim 11, wherein the non-uniform transformation function includes a two-dimensional special effect.

18. A destination image as claimed in claim 11, wherein the non-uniform transformation function includes a three-dimensional special effect.

19. A computer-implemented process for generating a non-uniformly transformed destination image including the steps of:
determining an affine transformation of a source image based on a non-uniform transformation;
defining axes in the source image according to the affine transformation;
calculating a linear transformation from an area in the source image to the axes, wherein the linear transformation corresponds to a non-uniform transformation and represents the shape of an area in the destination image transformed by a transformation defined according to the inverse of the non-uniform transformation;
modifying a reconstruction filter in the source image according to the linear transformation;
identifying pixels of the source image included in a support of the modified reconstruction filter;
calculating the value of a point in the destination image based on the value of each of the identified pixels in the source image; and
displaying the non-uniformly transformed destination image.

20. A computer system for generating a representation of a non-uniformly transformed source image including a processor and a memory connected to the processor for storing a program, which when executed by the processor performs the steps of:
receiving a source image, a desired special effect, and a reconstruction filter;
modifying the reconstruction filter based on the application of the desired special effect to the source image;
identifying pixels in the source image included in a support of the modified reconstruction filter;
determining the value of a pixel in a destination based on the identified pixels; and
rendering the destination image.

21. A computer system as claimed in claim 20, wherein the source image is a single image.

22. A computer system as claimed in claim 20, wherein the source image is a sequence of images.

23. A computer system as claimed in claim 20, wherein the modified reconstruction filter does not include at least one of a skew or a rotational component.

24. A computer system as claimed in claim 20, wherein the special effect includes two-dimensional or higher dimensional effects.

25. A process as claimed in claim 1, wherein the selected reconstruction filter is a quadrilateral.

26. A destination image as claimed in claim 11, wherein the reconstruction filter is a quadrilateral.

27. A computer-implemented process as claimed in claim 19, wherein the reconstruction filter is a quadrilateral.

28. A computer system as claimed in claim 20, wherein the reconstruction filter is a quadrilateral.

29. A destination image as claimed in claim 11, wherein the identifying pixels step further includes:
creating a rectangular bounding box which includes the support of the modified filter;
applying an inverse transformation to coordinates of each pixel with a center inside the bounding box; and
determining whether the coordinates are included in the support of the unmodified reconstruction filter.

30. A computer-implemented process as claimed in claim 19, wherein the identifying step further includes:
creating a rectangular bounding box which includes the support of the modified filter;
applying an inverse transformation to coordinates of each pixel with a center inside the bounding box; and
determining whether the coordinates are included in the support of the unmodified reconstruction filter.

31. A computer system as claimed in claim 20, wherein the identifying step further includes:
  creating a rectangular bounding box which includes the support of the modified filter;
  applying an inverse transformation to coordinates of each pixel with a center inside the bounding box; and
  determining whether the coordinates are included in the support of the unmodified reconstruction filter.

32. A process as claimed in claim 1, where the at least two axes determined by the affine transformation step are eigenvectors.

33. A computer-implemented process as claimed in claim 19, where the axes defined according to the affine transformation are eigenvectors.

34. A process for obtaining a value for a pixel in a destination image produced by non-uniform transformation of a source image, comprising the steps of:
  selecting a reconstruction filter;
  determining a linear transformation between a unit circle in a source image space and at least two orthogonal axes in the source image space, wherein the linear transformation corresponds to the non-uniform transformation and represents the shape of the unit circle in the destination image transformed by a transformation defined according to the inverse of the non-uniform transformation, wherein the unit circle is centered around a center of the at least two orthogonal axes;
  modifying the selected reconstruction filter using the transformation to create a modified reconstruction filter with a support region;
  identifying which pixels from the source image are included in the support region of the modified reconstruction filter; and
  determining the value for the pixel in the destination image from pixel centers of the source image included in the support of the modified reconstruction filter.

35. A process as claimed in claim 34, wherein the determining a linear transformation step further includes:
  applying an affine transformation determined by the non-uniform transformation on a unit circle centered on the pixel in the destination image to define the at least two orthogonal axes.

36. A process as claimed in claim 34, wherein the identifying step further includes:
  creating a rectangular bounding box which includes the support of the modified filter;
  applying an inverse transformation to coordinates of each pixel with a center inside the bounding box; and
  determining whether the coordinates are included in the support of the unmodified selected reconstruction filter.

37. A process as claimed in claim 34, wherein the determining a value step includes:
  multiplying a color value of each pixel included in the support of the modified filter by the value from the unmodified selected reconstruction filter;
  determining a weighted average of the pixel values included in the modified filter.

38. A process as claimed in claim 34, wherein the identifying step further includes:
  determining pixels with centers in the support of the modified filter by treating the support of the transformed filter as a polygon; and
  using a polygon rasterizing technique.

39. A process as claimed in claim 34, wherein the linear transformation step is performed for a plurality of pixels.

40. A process as claimed in claim 34, wherein the determining a linear transformation step includes approximating the non-uniform transformation for implementing two-dimensional special effects by a function.

41. A process as claimed in claim 34, wherein the determining a linear transformation step includes approximating the non-uniform transformation for implementing three-dimensional effects by a function.

42. A process as claimed in claim 34, wherein the determining a linear transformation step includes removing a skew component.

43. A process as claimed in claim 34, wherein the determining a linear transformation step includes removing a skew and a rotational component.

44. A process as claimed in claim 35, wherein the applying an affine transformation step is followed by performing a perspective projection.

45. A process as claimed in claim 34, wherein the selected reconstruction filter is a quadrilateral.

46. A process as claimed in claim 34, where the at least two orthogonal axes determined by the linear transformation step are orthogonal eigenvectors.

47. A process for obtaining a value for a pixel in a destination image produced by non-uniform transformation of a source image, comprising the steps of:
  selecting a reconstruction filter;
  determining a linear transformation between an area in a source image space and at least two axes, wherein the linear transformation corresponds to the non-uniform transformation and represents the shape of the area in the destination image transformed by a transformation defined according to the inverse of the non-uniform transformation, wherein the area is centered around a center of the at least two axes, wherein the at least two axes are at least two units in length, wherein each unit is equal to a distance between two adjacent pixels;
  modifying the selected reconstruction filter using the transformation to create a modified reconstruction filter with a support region;
  identifying which pixels from the source image are included in the support region of the modified reconstruction filter; and
  determining the value for the pixel in the destination image from pixel centers of the source image included in the support of the modified reconstruction filter.

48. A process as claimed in claim 47, wherein the determining a linear transformation step further includes:
  applying an affine transformation determined by the non-uniform transformation on an area centered on the pixel in the destination image to define the at least two axes.

49. A process as claimed in claim 47, wherein the identifying step further includes:
  creating a rectangular bounding box which includes the support of the modified filter;
  applying an inverse transformation to coordinates of each pixel with a center inside the bounding box; and
  determining whether the coordinates are included in the support of the unmodified selected reconstruction filter.

50. A process as claimed in claim 47, wherein the determining a value step includes:
  multiplying a color value of each pixel included in the support of the modified filter by the value from the unmodified selected reconstruction filter;
  determining a weighted average of the pixel values included in the modified filter.

51. A process as claimed in claim 47, wherein the identifying step further includes:
   determining pixels with centers in the support of the modified filter by treating the support of the transformed filter as a polygon; and
   using a polygon rasterizing technique.

52. A process as claimed in claim 47, wherein the linear transformation step is performed for a plurality of pixels.

53. A process as claimed in claim 47, wherein the determining a linear transformation step includes approximating the non-uniform transformation for implementing two-dimensional special effects by a function.

54. A process as claimed in claim 47, wherein the determining a linear transformation step includes approximating the non-uniform transformation for implementing three-dimensional effects by a function.

55. A process as claimed in claim 47, wherein the determining a linear transformation step includes removing a skew component.

56. A process as claimed in claim 47, wherein the determining a linear transformation step includes removing a skew and a rotational component.

57. A process as claimed in claim 48, wherein the applying an affine transformation step is followed by performing a perspective projection.

58. A process as claimed in claim 47, wherein the selected reconstruction filter is a quadrilateral.

59. A process as claimed in claim 47, where the at least two axes determined by the linear transformation step are eigenvectors.

60. A computer-implemented process for generating a non-uniformly transformed destination image including the steps of:
   calculating a linear transformation from a unit circle in a source image to orthogonal axes in the source image, wherein the linear transformation corresponds to a non-uniform transformation and represents the shape of a unit circle in the destination image transformed by a transformation defined according to the inverse of the non-uniform transformation;
   modifying a reconstruction filter in the source image according to the linear transformation;
   identifying pixels of the source image included in a support of the modified reconstruction filter;
   calculating the value of a point in the destination image based on the value of each of the identified pixels in the source image; and
   displaying the non-uniformly transformed destination image.

61. A computer-implemented process as claimed in claim 60, wherein the reconstruction filter is a quadrilateral.

62. A computer-implemented process as claimed in claim 60, wherein the identifying step further includes:
   creating a rectangular bounding box which includes the support of the modified filter;
   applying an inverse transformation to coordinates of each pixel with a center inside the bounding box; and
   determining whether the coordinates are included in the support of the unmodified reconstruction filter.

63. A computer-implemented process as claimed in claim 60, where the orthogonal axes defined according to the linear transformation are orthogonal eigenvectors.

64. A computer-implemented process as claimed in claim 60, wherein the calculating a linear transformation step further includes:
   determining an affine transformation of the source image based on the non-uniform effect; and
   defining the orthogonal axes according to the affine transformation.

65. A computer-implemented process for generating a non-uniformly transformed destination image including the steps of:
   calculating a linear transformation from an area in a source image to axes in the source image, wherein the linear transformation corresponds to a non-uniform transformation and represents the shape of the area in the destination image transformed by a transformation defined according to the inverse of the non-uniform transformation, wherein the axes are at least two units in length, wherein each unit is equal to a distance between two adjacent pixels;
   modifying a reconstruction filter in the source image according to the linear transformation;
   identifying pixels of the source image included in a support of the modified reconstruction filter;
   calculating the value of a point in the destination image based on the value of each of the identified pixels in the source image; and
   displaying the non-uniformly transformed destination image.

66. A computer-implemented process as claimed in claim 65, wherein the reconstruction filter is a quadrilateral.

67. A computer-implemented process as claimed in claim 65, wherein the identifying step further includes:
   creating a rectangular bounding box which includes the support of the modified filter;
   applying an inverse transformation to coordinates of each pixel with a center inside the bounding box; and
   determining whether the coordinates are included in the support of the unmodified reconstruction filter.

68. A computer-implemented process as claimed in claim 65, where the axes defined according to the transformation are eigenvectors.

69. A computer-implemented process as claimed in claim 65, wherein the calculating a linear transformation step further includes:
   determining an affine transformation of the source image based on the non-uniform effect; and
   defining the axes according to the affine transformation.

* * * * *